United States Patent Office 3,473,936
Patented Oct. 21, 1969

3,473,936
THERMALLY CRYSTALLIZABLE GLASSES, CRYSTALLIZED PRODUCT AND METHOD OF MAKING SAME
William E. Smith, Sylvania, Ohio, assignor to Owens-Illinois, Inc., a corporation of Ohio
No Drawing. Filed Sept. 24, 1965, Ser. No. 490,063
Int. Cl. C03c 3/04; C04b 35/14
U.S. Cl. 106—39                                      3 Claims

ABSTRACT OF THE DISCLOSURE

Disclosed herein are thermally crystallizable glasses containing $SiO_2$, $Al_2O_3$, MgO, BaO, and $Li_2O$ and having a liquidus temperature of from about 2300° F. to less than 2450° F., crystallized glasses made therefrom, and methods of making the crystallized glasses.

---

The present invention relates to novel compositions of matter. More specifically, the invention pertains to glass-ceramic compositions which can be made with no added nucleating agents or a minimum amount thereof. The crystallizable glasses of the instant invention comprise $SiO_2$, $Al_2O_3$, MgO, BaO and $Li_2O$. The crystallizable glasses may also contain minimum concentrations of $ZrO_2$ and $TiO_2$.

It is an object of the present invention to provide novel, thermally crystallizable glasses with good working properties suitable for commercial and automatic machine forming processes. A further object is to provide new ceramics resulting from in situ crystallization of such glasses. A still further object of the instant invention is to provide novel glass compositions which can be crystallized with an added nucleating agent. Yet a still further object of the instant invention is to provide novel glass compositions which can be crystallized with minimum amounts of added nucleants. Yet a still further object is to provide ceramic bodies having a low coefficient of thermal expansion and other desirable properties.

Other objects, as well as aspects and advantages, of the invention will become apparent from the accompanying disclosure and claims.

Glass-ceramics are generally made by the crystallization of glass. It is conventional in the art to employ high amounts of nucleants, such as titanium dioxide, zirconium dioxide and the like for making glass-ceramics from glasses. The amount of titanium dioxide incorporated as the nucleating agent in the original vitreous composition is generally at least three weight percent, usually more. The use of such appreciable amounts of titanium dioxide in glass compositions suffers from the disadvantages that it is highly expensive, often results in discoloration apparently due to $TiO_2$ being reduced to colorant $Ti_2O_3$. If the glass contains high amounts of zirconia, the glass lacks desirable working properties for formation of articles of commerce by high-speed automatic machine methods. Often, such glasses have liquidus temperatures in excess of 2600° F. which tends to make such glass unacceptable for melting and forming by commerical high-speed automatic methods. Similarly, glass compositions containing high amounts of a mixture of $TiO_2$ and $ZrO_2$ are not practical for making crystallized products at commercial rates with automatic machines because the liquidus temperature of the glasses are extremely high and the viscosities of the glasses are apparently too low at the liquidus temperature.

Surprisingly, it has now been discovered that crystallizable glass compositions can be made that are free from added nucleants or contain limited amounts of nucleants. The glasses of the present invention comprise a five component system, $Li_2O$—MgO—BaO—$Al_2O_3$—$SiO_2$, that can be crystallized to glass-ceramic bodies which are highly crystalline, exhibit strengths measured as modulus of rupture greater than ordinary glass, show very low thermal expansion in the order of $10 \times 10^{-7}$ and are white and glossy in appearance.

Glasses of the present invention have a composition containing the following essential components in the following percentage limits based on the total composition:

TABLE I

| | |
|---|---|
| $SiO_2$ | 70–75 |
| $Al_2O_3$ | 16–18 |
| MgO | 5–6 |
| BaO | 1.5–3 |
| $Li_2O$ | 2.5–3 |

In addition, certain nucleating agents, $ZrO_2$ and/or $TiO_2$, can be added without seriously affecting the glass-working properties so long as the total amount of said nucleants does not exceed 1.5%; however, the nucleants are not needed in the present glass compositions.

The five components of the glasses are essential for producing the desirable glass-working properties of the instant glasses. The exclusion or alteration of the disclosed concentration of any one of the five major components results in the loss of one or more of the highly desirable properties, for example, the removal of BaO results in materials which develop microcracks during heat treatment and therefore the material develops very little strength. If the BaO content is lower than 1.5%; deformation occurs during the heat treatment stage. The omission of the MgO or the $Li_2O$ component increases the liquidus temperature and the viscosity to the point where the glass has very poor working properties, and, in addition, crystallization characteristics are degraded. Essentially the same effects, that is, change in working properties and crystallization characteristic changes are evident if the implied ratio of the silica to alumina is varied beyond the instant disclosed range. In summary, the compositions of the present invention as set forth in Table II contain the following essential components and may also contain titania and zirconia nucleants, the total amount of the latter two components not exceeding 1.5%.

TABLE II

| | |
|---|---|
| $SiO_2$ | 70–75 |
| $Al_2O_3$ | 16–18 |
| MgO | 5–6 |
| BaO | 1.5–3 |
| $Li_2O$ | 2.5–3 |
| $ZrO_2$ | 0–1.5 |
| $TiO_2$ | 0–1.5 |

A further advantage of the present glasses from the practical standpoint is that they have liquidus temperatures below 2450° F., and can therefore be handled in commercial equipment without present danger of devitrification in cold spots in the furnace. For automatic pressing and automatic blowing operations, it is desirable to have a glass whose liquidus temperature is not more than 200° F. above the temperature at which the logarithm of the viscosity in poises is 4, preferably not more than 100° F.; also, in order to have reasonable operating temperatures in the forehearth and feeder of the furnace, and to have a not too severe temperature when the glass initially contacts the molds, it is preferred that this log 4 temperature not exceed 2450° F. The log 4 viscosity of the instant glasses is, generally, below 2450° F.

The glasses of the present invention may be melted by conventional means; that is, in gas fired furnaces, in laboratory platinum crucibles or in alumina refractories. When alumina refractories are employed, some adjustment in the alumina batch compositions may be necessary because of the possibility of alumina entering the composition from the refractory. In a typical example of the present invention, the following batch materials may be melted at a glass temperature of about 2900° F. for about 43 hours in a high-alumina refractory tank furnace. The batches shown in the table below, are for various melts expressed in parts by weight, specifically, as pounds per 5000 pounds of melt.

TABLE III

| Ingredients | 1 | 2 | 3 |
|---|---|---|---|
| Petalite | 3,392.9 | 3,392.9 | 3,392.9 |
| Flint | 950.4 | 894.8 | 895.2 |
| Alcoa A-10 Alumina | 290.3 | 270.2 | 270.2 |
| MgO USP | 270.4 | 270.4 | 270.4 |
| BaCO₃ | 188.5 | 188.5 | 188.5 |
| Florida Zircon | | 75.8 | |
| Titanox | | | 75.4 |

The glasses had an average log 4 viscosity of about 2400° F., and an average liquidus temperature of about 2350° F. A number of glass rods (cane) were pulled from the tank during melting. The cane had a diameter of about ¼ inch and it was set aside for heat treatment and determination of properties of the resulting heat treated product. The canes were subsequently heat treated by generally following the heat treatment procedure disclosed herein.

The heat treatment steps employed herein comprise forming a glass object or article from a glass of the invention and thereafter heat treating the glass first at a low temperature to cause micro-heterogeneous glass-in-glass phase separation, and thereafter, at a higher temperature to complete crystallization to the desired degree. The optimum heat treatment schedule depends as will be understood, on the particular glass composition, the ratio of its ingredients and the kind and amount of its nucleants, as well as the final properties desired. Therefore, it is self-evident to those versed in the art, it is not possible to specify a heat treatment schedule that will be common to all of the glasses of the invention. However, it is usually preferred that the first mentioned low temperature heat treatment be in the region of maximum or high rate of nuclei formation. This temperature usually lies in the range from the annealing point of the glass to 250° F. above the annealing point of the glass.

The optimum heat treatment temperature can be empirically determined employing small droplets of the glass and a micro-furnace capable of very rapid temperature changes and accurate temperature control. A droplet of the glass that has been cooled to below the annealing point temperature can be rapidly heated in the micro-furnace to a specific temperature between the annealing point and 250° F. above the annealing point, and held at such temperature for a specified time interval, the length of time of heating depending, again, upon the particular glass. Thus, if the glass inherently very rapidly forms nuclei, a shorter standard time at the lower temperature can be used than if the nuclei are relatively only slowly formed. Generally, as an example, a droplet of the glass can be heated for 15 minutes at 40° F. above the annealing point temperature. Thereafter, the droplet of glass in the micro-furnace is very rapidly heated to a predetermined crystallization temperature within the range, say, from 1800–1950° F. and held at such predetermined temperature for a specific length of time, for example, one-half hour. This process can be repeated, using the same length of time of initial and final heating and the same temperature of final heating, but using different initial heating temperatures, say 30, 50, 60, 70 and 80° F. above the annealing point temperature. Thereafter, by microscopic examination, one can determine which initial heat treatments resulted in formation of the most and finest crystals, and thus determine the range of temperature where maximum number of crystallization centers formed.

The process of the invention usually comprises, depending of course upon the composition, heat treating the formed article rapidly at about 1100° F. Then, heating from 1100° to 1300° F. at a uniform rate to reach elevated temperature in 2 hours. Next, heating from 1300° to 1450° F. for one hour, from 1450° to 1500° F. for one hour and from 1500° to 1900° F. for one hour. Finally, the formed object is cooled at a rate of about 400° F. per hour.

A glass composition consisting essentially of 72.1% $SiO_2$, 16.9% $Al_2O_3$, 5.3% MgO, 2.8% BaO and 2.8% $Li_2O$ was treated as immediately above described and exhibited the following ceramic properties: average thermal expansion 8.0, strength (p.s.i. × $10^3$) of 11.7 and a thermal shock resistance of 900° F. Generally, the heat treatment will depend upon the nature of the glass composition and other essential factors as hereinbefore stated and the present example is not to be construed as limiting the heat treatment schedule.

Following in table form are further illustrative specific examples of glasses and the ceramics resulting from them according to the method of the invention.

TABLE IV

| | Percent by Weight | | | | | |
|---|---|---|---|---|---|---|
| | 1 | 2 | 3 | 4 | 5 | 6 |
| Ingredients: | | | | | | |
| $SiO_2$ | 72.1 | 73.1 | 72.1 | 71.0 | 71.5 | 71.1 |
| $Al_2O_3$ | 16.9 | 17.0 | 16.9 | 16.5 | 16.5 | 16.6 |
| MgO | 5.3 | 5.5 | 5.3 | 5.3 | 5.3 | 5.2 |
| BaO | 2.85 | 1.5 | 2.85 | 2.85 | 2.85 | 2.8 |
| $Li_2O$ | 2.85 | 2.9 | 2.85 | 2.85 | 2.85 | 2.8 |
| $ZrO_2$ | | | 0.5 | | 1.0 | 1.5 |
| $TiO_2$ | | | | 1.5 | | |
| Glass Properties: | | | | | | |
| Liquidus Temperature | 2,310 | 2,345 | | 2,300 | 2,300 | 2,440 |
| Log 4 Viscosity | 2,430 | 2,350 | | 2,380 | 2,410 | |
| Ceramic Properties: | | | | | | |
| Modulus of Rupture, p.s.i. ×10³ | 11.7 | 10.4 | | 14.1 | 11.1 | |
| Thermal Shock | 900 | 1,000 | | 1,000 | 1,000 | |

For determining the thermal shock resistance of the ceramics of the invention, cane or rods of the ceramic were plunged into water from an oven maintained 80° F. above the temperature shown in Table III. The water was at 80° F. above or lower. A value of 1000° F., for instance, in Table III means that the rod did not crack or craze even slightly at the temperature differential indicated, but that it did crack when tested at the next hundred degree interval higher. Slight hairline cracks or crazing were detected by immersing the thermally shocked samples in a dye solution.

The tested flexural strength of the crystallized material was determined using cane samples. The modulus of rupture tests were made using a Tinius-Olsen testing machine. This machine applies a measured load through a single knife edge to the center of a 4 inch long sample of cane supported on two knife edges (3 point loading). The load is applied at a constant rate of 24 pounds per minute until failure occurs, with a marker indicating the highest load applied to the point of failure. Before the cane samples are tested, the yarn abraded uniformly by rotating in a slow-speed drill press in contact with 320-grit emery paper under hand pressure. This technique assures that the abrasions are parallel to the direction of loading. A dial micrometer calibrated in inches and equipped with a bar contact instead of a point contact is used to measure maximum and minimum diameters at the center of the sample to an accuracy of 0.0005 inch. Since few cane samples are perfectly round, the load is formula for an elliptical cross-section is used in calculating the modulus of rupture as follows:

$$MR = \frac{\text{load (lbs.)} \times 8 \times \text{span (in.)}}{(D_1^2 \times D_2)\pi}$$

Each value reported is the average of a number of cane samples.

The compositions of the present invention are useful for making articles of commerce, well-known to the glass

What is claimed is:

1. A thermally crystallizable glass having a liquidus temperature of from about 2300° F. to less than 2450° F. consisting essentially of the following ingredients:

| Ingredient: | Percent by weight |
| --- | --- |
| $SiO_2$ | 70–75 |
| $Al_2O_3$ | 16–18 |
| $MgO$ | 5–6 |
| $BaO$ | 1.5–3 |
| $Li_2O$ | 2.5–3 |
| $TiO_2+ZrO_2$ | 0–1.5 |

2. In a method of making a crystallized product, the steps of melting and forming a vitreous composition having a liquidus temperature of from about 2300° F. to less than 2450° F. consisting essentially of

| Ingredient: | Percent by weight |
| --- | --- |
| $SiO_2$ | 70–75 |
| $Al_2O_3$ | 16–18 |
| $MgO$ | 5–6 |
| $BaO$ | 1.5–3 |
| $Li_2O$ | 1.5–3 | and a nucleant selected from the group consisting of $TiO_2$, $ZrO_2$ and mixtures thereof, said nucleant in an amount of less than 1.5 weight percent, and the sum of the nucleants not exceeding 1.5 weight percent; and heat treating the formed vitreous composition to crystallize said composition.

3. A crystallized glass product formed by thermal in situ crystallization of a thermally crystallizable glass composition having a liquidus temperature of from about 2300° F. to less than 2450° F. and consisting essentially of 70 to 75 weight percent $SiO_2$, 16 to 18 weight percent $Al_2O_3$, 5 to 6 weight percent $MgO$, 1.5 to 3 weight percent $BaO$, 2.5 to 3 weight percent $Li_2O$, 0 to 1.5 weight percent $TiO_2$, and 0 to 1.5 weight percent $ZrO_2$, the total of $TiO_2+ZrO_2$, in said mixture not exceeding 1.5 weight percent.

References Cited

UNITED STATES PATENTS

| | | | |
| --- | --- | --- | --- |
| 2,960,802 | 11/1960 | Voss | 106—39 |
| 3,006,775 | 10/1961 | Chen | 106—39 |
| 3,022,179 | 2/1962 | Morrissey | 106—39 |
| 3,117,881 | 1/1964 | Henry et al. | 106—39 |
| 3,157,522 | 11/1964 | Stookey | 106—39 |
| 3,231,456 | 1/1966 | McMillan et al. | 106—39 |
| 3,241,985 | 3/1966 | Kuwayama | 106—39 |
| 3,252,811 | 5/1966 | Beall | 106—39 |
| 3,282,712 | 11/1966 | Tashiro et al. | 106—39 |
| 3,380,818 | 4/1968 | Smith | 65—33 |

FOREIGN PATENTS

| | | |
| --- | --- | --- |
| 1,300,614 | 6/1962 | France. |
| 1,268,125 | 6/1961 | France. |
| 383,912 | 4/1963 | Japan. |
| 14,308 | 7/1965 | Japan. |

HELEN M. McCARTHY, Primary Examiner

U.S. Cl. X.R.

65—33; 106—52